United States Patent [19]

Hasegawa et al.

[11] Patent Number: 5,594,644
[45] Date of Patent: Jan. 14, 1997

[54] METHOD AND SYSTEM FOR GENERATING TRAJECTORY OF ROBOT AND THE LIKE

[75] Inventors: Tadaaki Hasegawa; Toru Takenaka, both of Saitama, Japan

[73] Assignee: Honda Giken Kogyo Kabushiki Kaisha, Tokyo, Japan

[21] Appl. No.: 65,242

[22] Filed: May 20, 1993

[30] Foreign Application Priority Data

May 22, 1992 [JP] Japan .................................... 4-155915

[51] Int. Cl.$^6$ .............................. G06F 7/70; G05B 19/04
[52] U.S. Cl. ...................... 364/424.027; 395/81; 395/95; 395/96; 395/86; 318/568.1; 318/568.12; 318/561; 901/1; 901/2; 901/46; 901/47
[58] Field of Search ....................... 364/424.02, 424.01, 364/513, 413.01, 474.24, 148, 150, 162, 165, 181, 474.35, 516, 571.01, 478; 901/1, 2, 46, 9, 47; 180/8, 1, 8.2, 8.6; 318/568.12, 568.1, 567, 568.13, 571–573; 395/95, 90, 119, 97, 87, 89, 94, 98, 85–86

[56] References Cited

U.S. PATENT DOCUMENTS

| | | | |
|---|---|---|---|
| 4,639,878 | 1/1987 | Day et al. | 364/478 |
| 4,772,831 | 9/1988 | Casler, Jr. et al. | 378/568 |
| 4,823,279 | 4/1989 | Perzley et al. | 364/513 |
| 4,990,838 | 2/1991 | Kawato et al. | 395/95 |
| 4,999,553 | 3/1991 | Seraji | 318/561 |
| 5,005,658 | 4/1991 | Bares et al. | 180/8.1 |
| 5,015,006 | 5/1991 | Takehara et al. | 364/424.01 |
| 5,046,022 | 9/1991 | Conway et al. | 364/190 |
| 5,053,976 | 10/1991 | Nose et al. | 364/513 |
| 5,151,859 | 9/1992 | Yoshino et al. | 364/424.02 |
| 5,206,569 | 4/1993 | Ozawa | 318/568.12 |
| 5,214,615 | 5/1993 | Bauer | 367/128 |
| 5,230,045 | 7/1993 | Sindhu | 395/425 |
| 5,255,753 | 10/1993 | Nishikawa et al. | 180/8.6 |
| 5,260,629 | 11/1993 | Ioi et al. | 364/150 |
| 5,282,274 | 1/1994 | Liu | 395/425 |
| 5,357,433 | 10/1994 | Takenaka | 364/424.02 |
| 5,389,865 | 2/1995 | Jacobus et al. | 395/95 |
| 5,396,160 | 3/1995 | Chen | 364/474.24 |

FOREIGN PATENT DOCUMENTS

| | | |
|---|---|---|
| 3184782 | 8/1991 | Japan . |
| 3248207 | 11/1991 | Japan . |

Primary Examiner—Kevin J. Teska
Assistant Examiner—Jacques Louis-Jacques
Attorney, Agent, or Firm—Lyon & Lyon

[57] ABSTRACT

A trajectory generation for a member such as a foot of a legged mobile robot. First, basic trajectories defining some typical motions of the foot including a constraint condition are established on a virtual plane or surface fixed on a coordinate system. The virtual plane is kept fixed on the ground until a time the foot is to be lifted. Then at this period free from the constraint condition, the coordinate system is displaced such that the virtual surface coincides with another point of the ground on which the foot is to be landed. A trajectory for a footrise to footfall is thus generated by combining the basic trajectories in the coordinate system and the amount of displacement of the coordinate system. Thus, the boundary conditions become extremely simple and hence, trajectory generation is greatly simplified. A real time trajectory correction can be conducted if desired.

27 Claims, 12 Drawing Sheets

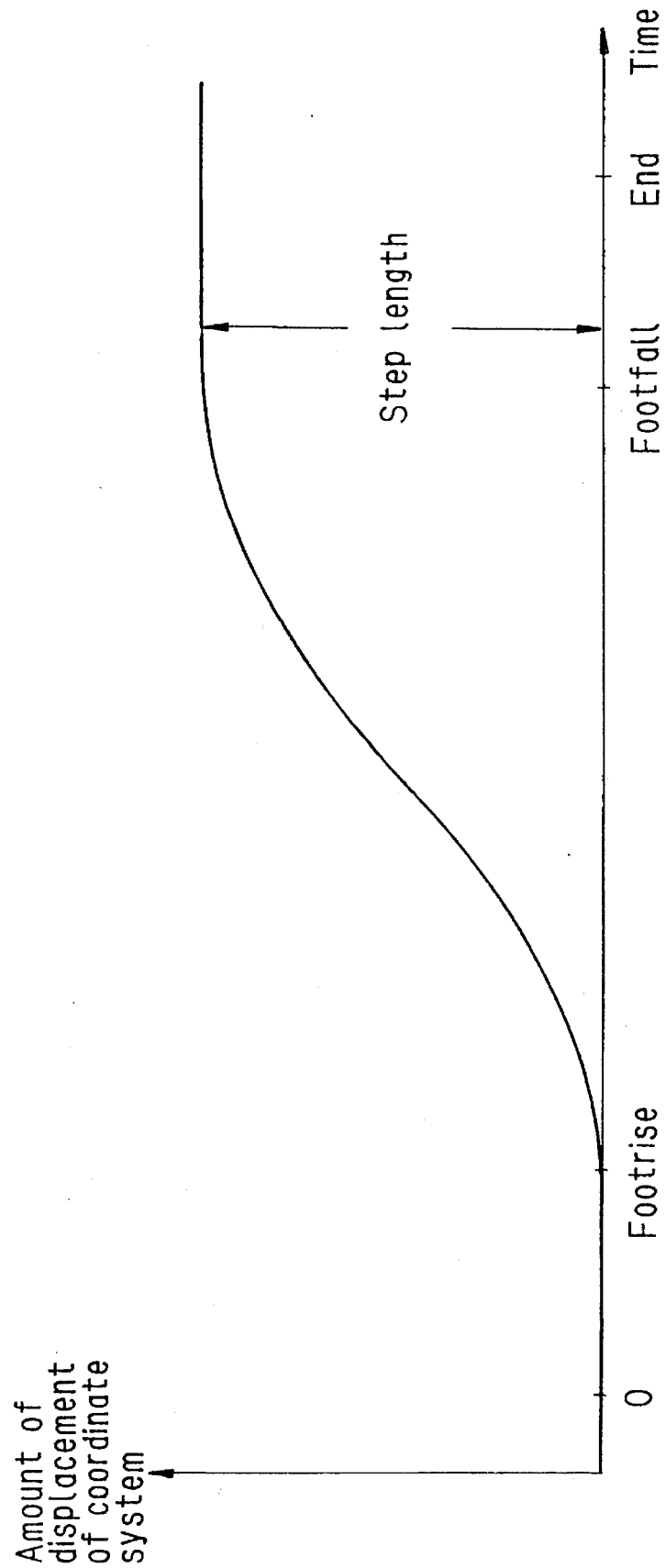

METHOD AND SYSTEM FOR GENERATING TRAJECTORY OF ROBOT AND THE LIKE

BACKGROUND OF THE INVENTION

1. Field of the Invention

This invention relates to a method and system for generating a trajectory of a robot and the like, more particularly to a method and system for easily generating the trajectory of the leg (feet) of a legged mobile robot or other such trajectories wherein the contact between the leg (feet) and the ground and other such constraint conditions in its motion vary.

2. Description of the Prior Art

Trajectories are generated for use in the control of various kinds of moving objects, space rockets being a well-know example. Trajectory generation is also used in the control of robots, which have been proposed in stationary, mobile and other types. For example, Japanese Laid-open Patent Publication No. 3(1992)-248,207 teaches a trajectory generation of a distal end of a robotic arm, in which a smooth and continuous trajectory is generated by combining first and second acceleration/deceleration patterns in such a manner that the second pattern's acceleration is started before the first pattern ends while the second pattern's deceleration is suspended until the first pattern ends.

The reference relates to a stationary robot. For easier understanding, the invention will be explained with respect to a legged mobile robot of the biped locomotion type. Since a biped walking robot moves by alternately kicking against the ground with its two legs while at the same time supporting its own weight, the constraint conditions differ between the time of footrise and the time of footfall. This is shown in FIG. 12. At footrise the leg trajectory is constrained so that the leg rotates about the toe, while at footfall it is constrained so that it rotates about the heel. For defining the leg trajectory it is necessary to define the angle and position of, for example, the ankle joint. Although FIG. 12 indicates the position (displacement) of the ankle joint, for generating a smooth trajectory it is necessary to define the displacement, displacement velocity, displacement acceleration, angle, angular velocity and angular acceleration thereof. In such cases, the trajectory in space has conventionally been generated using a sixth-order polynomial. In cases where the constraint conditions differ between footrise and footfall, for example, it has therefore been necessary to solve the boundary conditions (boundary value problem) in order to obtain a smooth connecting trajectory. The amount of computation required for this, which is considerable even during straight walking on level ground, increases sharply when the ground is inclined and becomes extremely large during turning and the like. In the prior art, therefore, the computation is conducted in advance and the result stored in a memory of a microcomputer mounted on the robot. Therefore, when the robot encounters unexpected ground irregularities, slopes or obstacles, it cannot correct the trajectory in real time.

SUMMARY OF THE INVENTION

An object of this invention is therefore to overcome the aforesaid problems by providing a method and system for generating a trajectory of a robot and the like, which generate a trajectory that satisfies the boundary conditions to be generated easily even when the constraint conditions vary.

Another object of the invention is to provide a method and system for generating a trajectory of robots and the like, which enable real time trajectory correction to be conducted easily.

For realizing this object, the present invention provides a method for generating a trajectory of a member such as a member of a robot to be displaced from a point P1 to a point P2 in real space, comprising, establishing a trajectory of the member defining its motion including a constraint condition thereof in a first coordinate system, and displacing the first coordinate system in a second coordinate system from the point P1 to the point P2 by translating or rotating the first coordinate system.

BRIEF DESCRIPTION OF THE DRAWINGS

The above and other objects and advantages of the invention will be more apparent from the following description and drawings, in which:

FIG. 5(iii) is a view more specifically explaining the basic trajectory, rotating about the heel.

FIG. 7 is a timing chart illustrating the amount of displacement of the first coordinate system;

FIG. 8b is a view illustrating the operation of the finite time settling function generator of FIG. 8a;

DETAILED DESCRIPTION OF THE PREFERRED EMBODIMENTS

Embodiments of the invention will now be explained based on a biped walking robot as an example.

Figure 1:
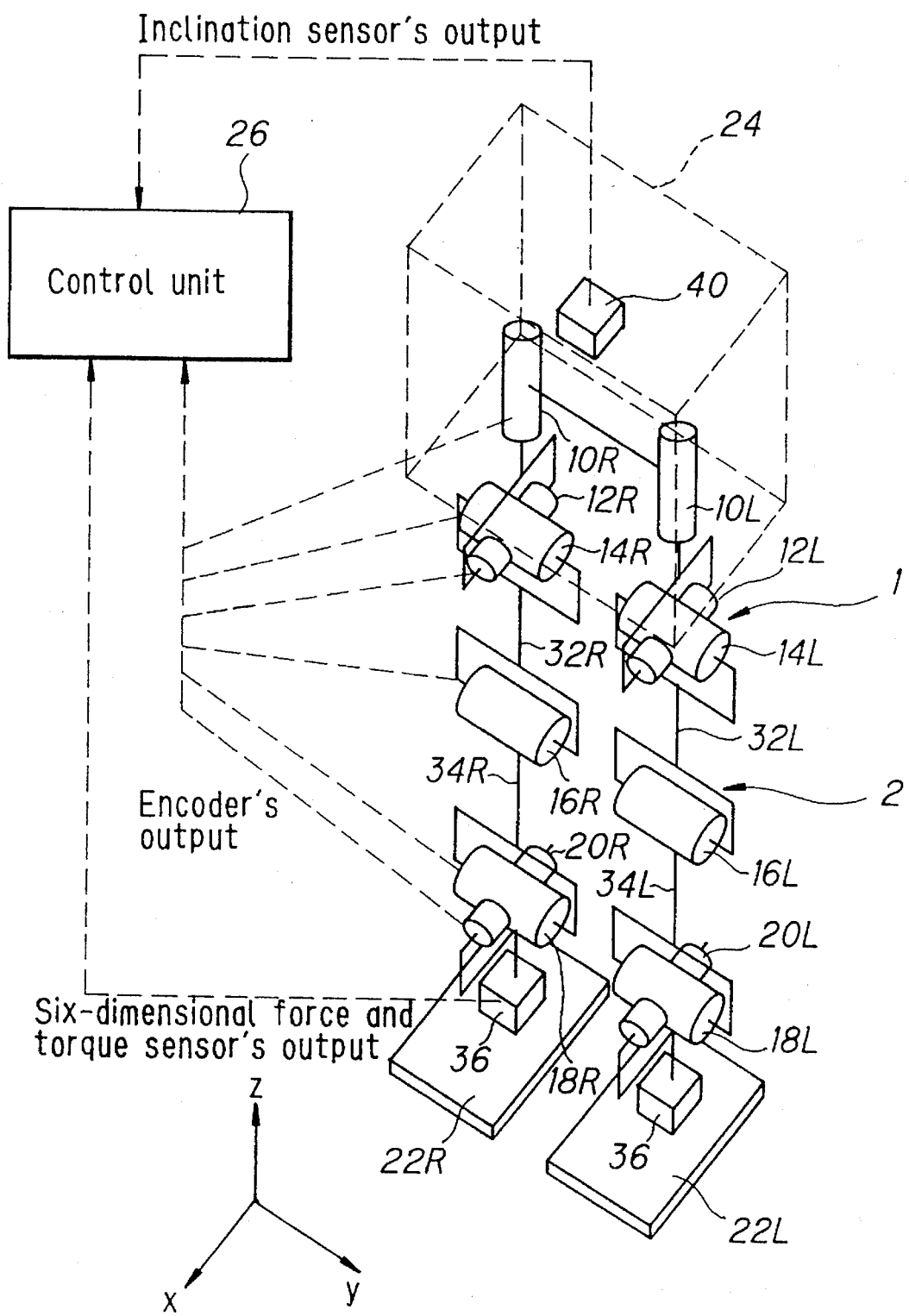
FIG. 1 is a schematic view showing the overall configuration of a biped walking robot and its locomotion control system taking as an example for a trajectory generation according to the invention.

An overall skeleton view of a biped walking robot 1 is shown in FIG. 1. The robot 1 has left and right legs 2 each having six joints (axes). (To make the arrangement easier to understand, the joints (axes) are represented as the electric motors by which they are driven.) The six joints (axes) are, starting at the top, joints (axes) 10R, 10L for swiveling (generally horizontal rotation) of the legs at the hip (R and L indicating the right and left legs), joints (axes) 12R, 12L for rotation at the hip in the pitch direction (rotation about the x axis), joints (axes) 14R, 14L for rotation at the hip in the roll direction (rotation about the y axis), joints (axes) 16R, 16L for rotation at the knee in the roll direction, joints (axes) 18R, 18L for rotation at the ankle in the roll direction and joints (axes) 20R, 20L for rotation at the ankle in the pitch direction. Feet 22R, 22L are provided at the lower end of this arrangement and a body (main unit) 24 housing a control unit 26 is provided at the upper end. The hip joints in the foregoing configuration are constituted by the joints (axes) 10R(L), 12R(L) and 14R(L) and the ankle joints by the joints (axes) 18R(L) and 20R(L). The hip and knee joints are connected by thigh links 32R, 32L and the knee joints and ankle joints by crus links 34R, 34L.

The legs 2 thus have six degrees of freedom, so that during locomotion the legs as a whole can be caused to execute the desired motion by driving the 6×2=12 joints (axes) to appropriate angle. The robot is thus capable of walking freely within three dimensional space. The joints are provided mainly by electric motors, as was mentioned earlier, and reduction gear mechanism for increasing motor torque. The structure of the joints is described in the assignee's earlier Japanese Patent Application No. 1(1989)-324,218 (Japanese Laid-Open Patent Publication No. 3(1991)-184,782) etc., and since it is not essential aspect of the present invention, will not be explained further here.

The individual ankles of the robot 1 shown in FIG. 1 are provided with a six dimensional force and torque sensor 36 of conventional design. By measuring the x, y and z force components Fx, Fy and Fz transmitted to the robot through the feet and also measuring the moment components Mx, My and Mz around the three axes, the six-dimensional force and torque sensor 36 detects whether or not the associated foot has landed and the magnitude and direction of the forces acting on the supporting leg. The sole of each foot is equipped at its four corners with touchdown switches 38, not illustrated in FIG. 1, of conventional design for detecting whether or not the foot is in contact with the ground. The top of the body 24 is provided with an inclination sensor 40 for detecting the robot's inclination angle and angular velocity relative to z axis in the x-z and y-z planes. Each electric motor at the individual joints is provided with a rotary encoder for generating rotational information. And, although not illustrated in FIG. 1, the robot 1 is provided with a zero reference switch 42 for calibrating the output of the inclination sensor 40 and a limit switch 44 for a fail safe. The outputs of the sensors 36 and the like are sent to the control unit 26 in the body.

Figure 2:
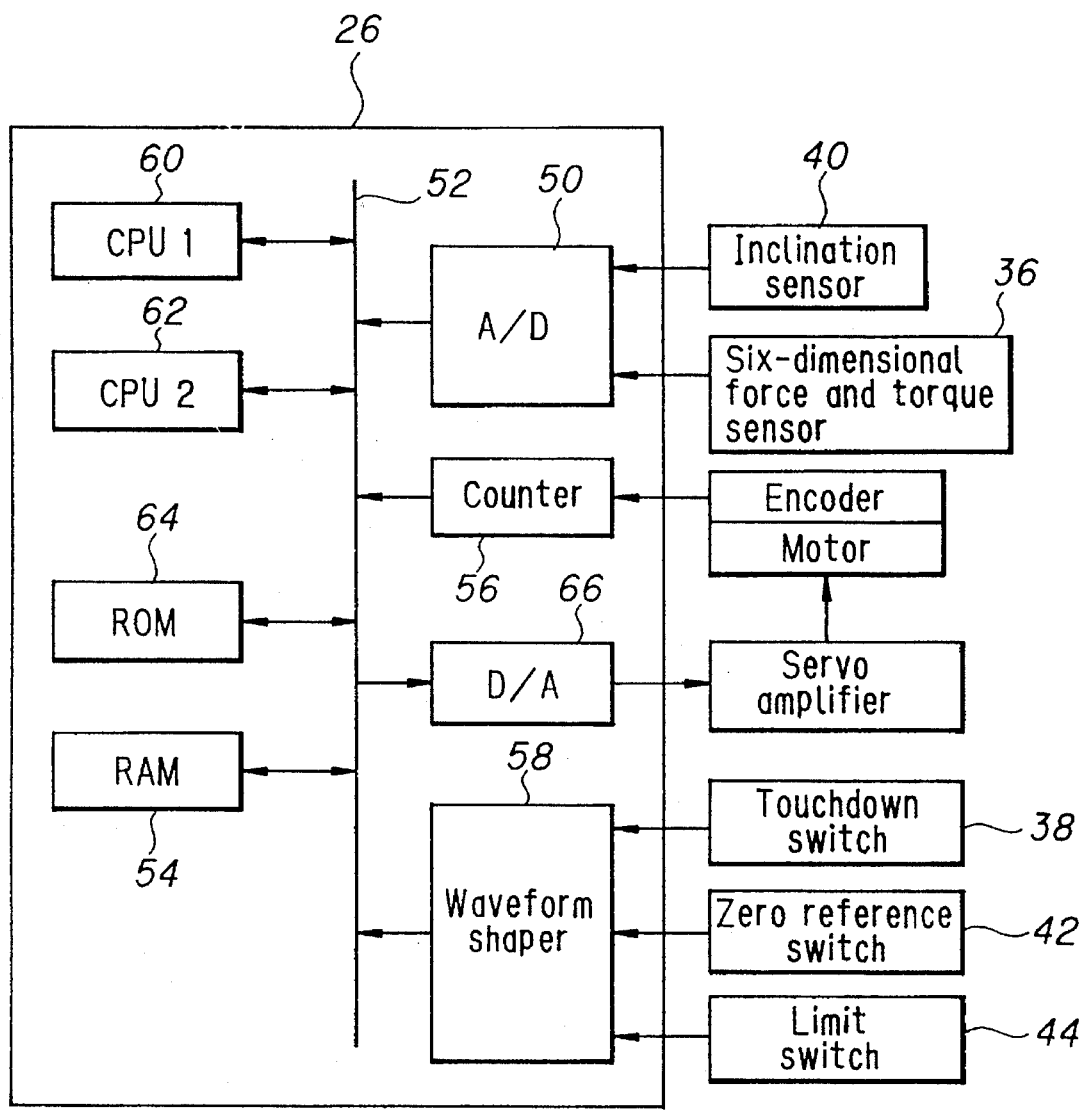
FIG. 2 is a block diagram showing the details of a control unit illustrated in FIG. 1.

As shown in the block diagram of FIG. 2, the control unit 26 has a microcomputer. The outputs from the inclination sensor 40 etc. are converted into digital signals by an A/D converter 50 and the resulting digital values are sent via a bus 52 to a RAM (random access memory) 54 for storage. In addition, the outputs of encoders disposed adjacent to the respective motors are input to the RAM 54 through a counter 56, while outputs of the touchdown switches 38 and the like are stored in the RAM 54 via a waveform shaper 58. The control unit has a first processor 60 and a second processor 62. The first processor 60 fetches a walking pattern defined in advance in terms of a ZMP (Zero Moment Point) trajectory, a basic leg trajectory (which will be explained later) or the like from a ROM (read-only memory) 64, computes target joint angles (joint drive pattern) and outputs the same to the RAM 54. The second processor 62 fetches the target joints angles (displacement commands) and measured joint angles from the RAM 54, computes control commands of the individual joint motors and sends the same to associated servo amplifiers thereof via a D/A converter 66 as illustrated in FIG. 3.

The invention will now be explained.

Figure 3:
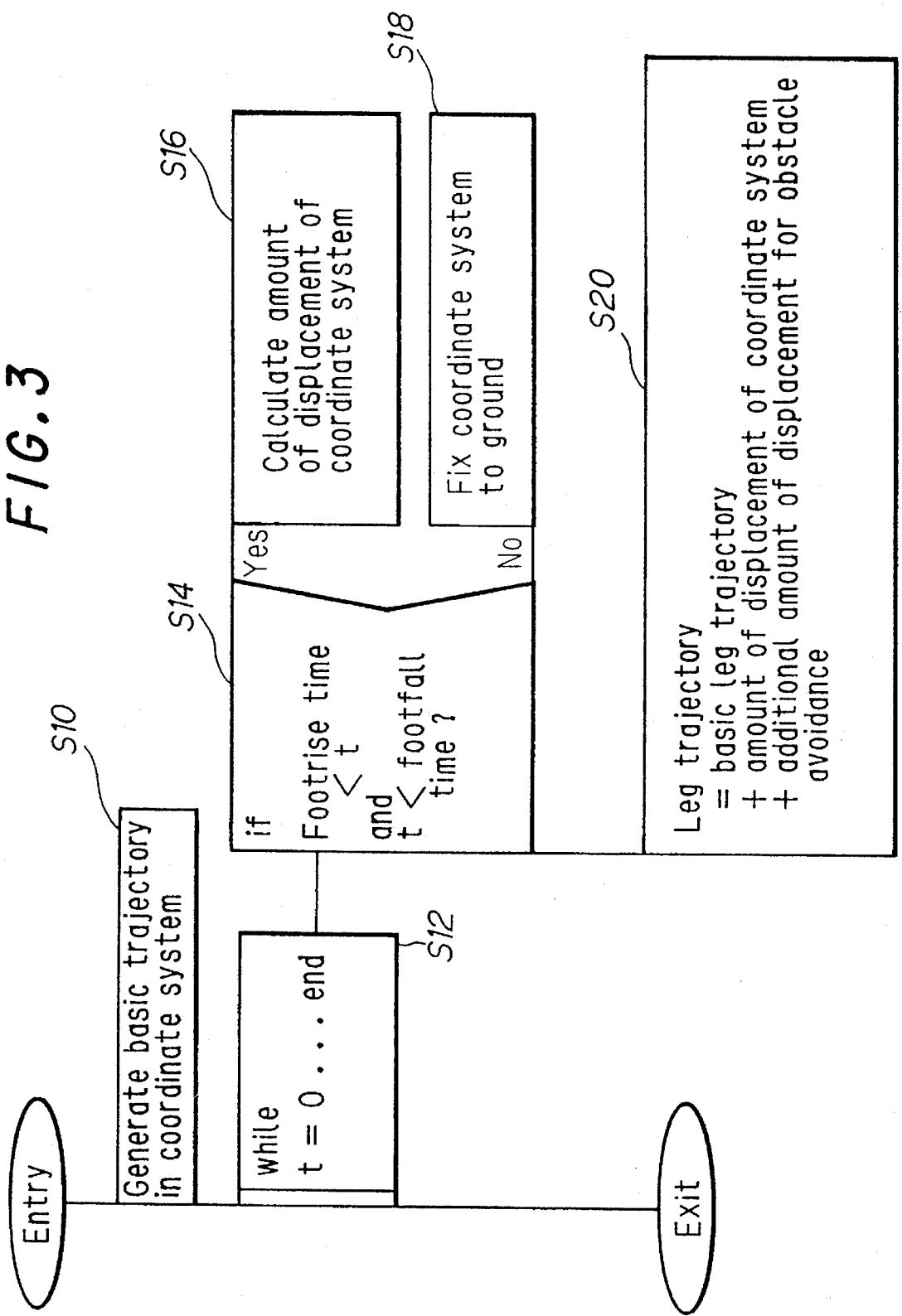
FIG. 3 is a flow chart explaining the trajectory generation according to the invention.

FIG. 3 is a structural flow chart (PAD diagram) showing the trajectory generation according to the invention.

Figure 4:
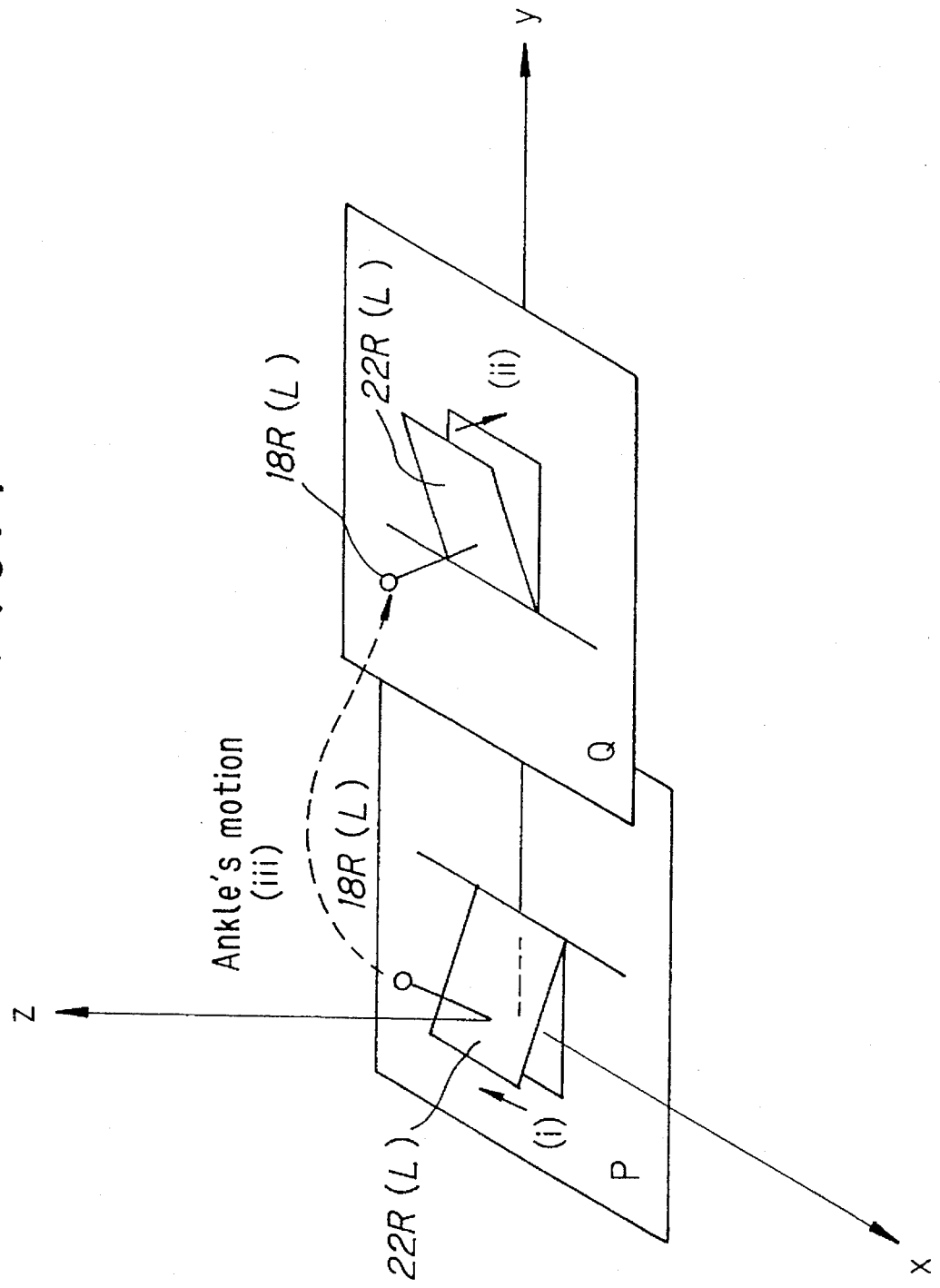
FIG. 4 is a view explaining a basic trajectory, taking a trajectory of the leg of the robot as an example, preestablished on a virtual ground surface fixed to a given coordinate system referred to in the flow chart of FIG. 3.

Before going into a detailed explanation with reference to FIG. 3, a brief overall description of the trajectory generation according to the invention will be given taking a leg (foot) trajectory of the robot as an example. First, as shown in FIG. 4, the aforesaid basic leg trajectory is generated in advance.

More specifically:

i) A leg trajectory up to the time of footrise from a virtual ground surface (plane) P fixed to a given coordinate system is generated.

ii) A leg trajectory that starts from footfall on another virtual ground surface (plane) Q is generated.

Based on them, a leg trajectory which connects i) and ii) and which provides a continuous and smooth ankle trajectory will be generated in a manner explained later.

Figure 5A:
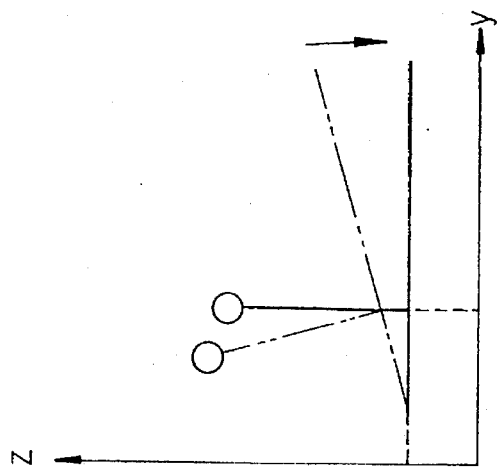
FIG. 5(i) is a view more specifically explaining the basic trajectory, rotating about a ground contact point.
FIG. 5(ii) is a view more specifically explaining the basic trajectory, rotating about the ankle.
Figure 5B:
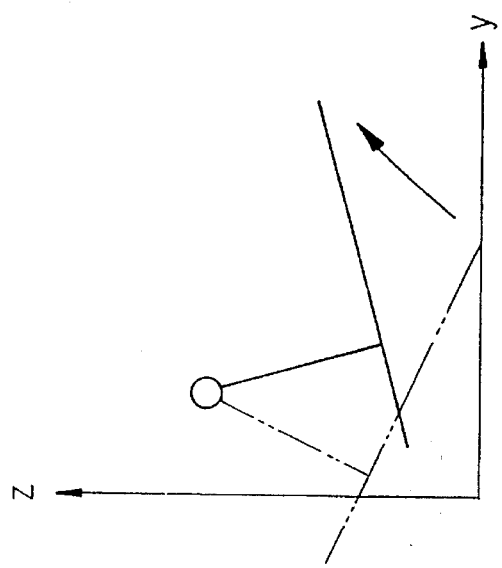
Figure 5C:
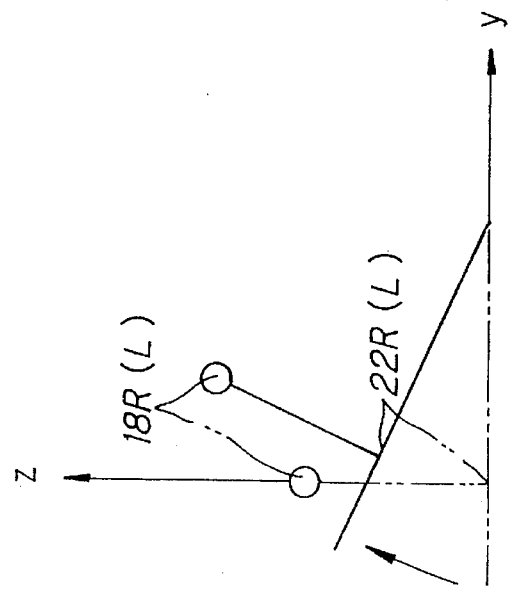

For avoiding the boundary problem by the simplest method possible, the aforesaid basic trajectory is generated beforehand as shown in FIG. 5.

i) A leg trajectory is generated which constrains the footrise point (ground contact point; forward extremity of foot 22R (L)), rotates the leg about the footrise point from the horizontal angle to the maximum foot angle and stops at the maximum foot angle.

ii) A leg trajectory is generated which constrains the ankle joint 18R (L), rotates the leg about the ankle joint from the maximum foot angle to the minimum foot angle and stops at the minimum foot angle.

iii) A leg trajectory is generated which constrains the footfall point (rearward extremity of the foot 22R (L)), rotates the leg about the footfall point from the minimum foot angle to the horizontal angle and stops at the horizontal angle.

Figure 6:
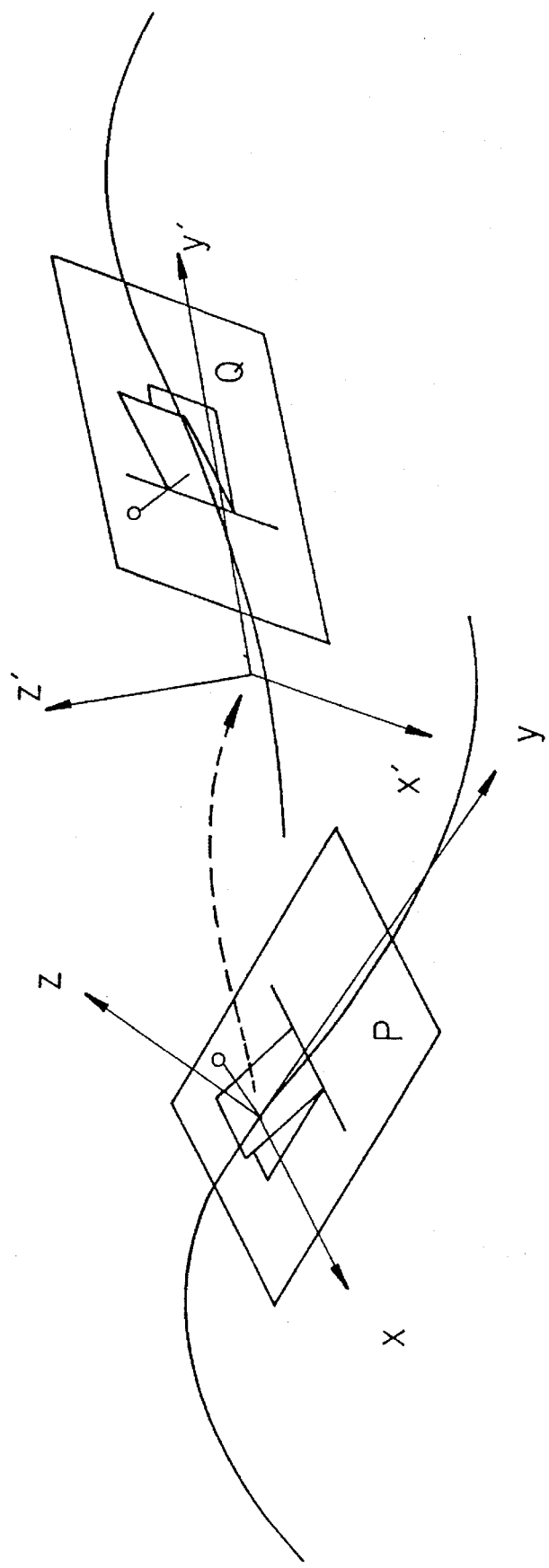
FIG. 6 is a view explaining a leg trajectory referred to in the flow chart of FIG. 3 generated by combining the basic trajectory in the first coordinate system and displacing the first coordinate system itself in a real space.

Next, as shown in FIG. 6, the position and orientation of the aforesaid coordinate system is imparted to the foot contact surface in real space before footrise so that the virtual ground surface P coincides therewith. Here, the trajectory is determined such that the kicking action of the foot is conducted with the coordinate system fixed to the foot.

Next, between footrise and footfall, the aforesaid coordinate system is displaced. More specifically, at a time of the footrise, the coordinate system is started to be displaced (translated or rotated) while gradually changing its position and orientation so as to bring, at a time of the footfall, the virtual ground surface Q into coincidence with the real space ground contact surface where footfall is to occur. In addition, any obstacle present is avoided by adding an additional amount to the displacement amount of the coordinate system. It should be noted that the footrise time can be defined as falling in the course of the foot kicking action in the basic leg trajectory. Even if it is in the course of the kicking action, footrise can still be achieved if the coordinate system is displaced upward. This results in even smoother walking.

Once the foot has landed, the coordinate system is thus fixed in real space and compliance operation is conducted. Specifically, the foot 22R (L) is brought down in good compliance with the ground surface so as to mitigate the impact at footfall.

Now referring to the flow chart of FIG. 3, this will be explained in detail.

First, the aforesaid basic trajectories of the leg is generated in step S10. Control then passes to step S12 in which the time t is set from 0 to end. The timing chart for this is shown in FIG. 7. Control then passes to step S14 in which a discrimination is made as to whether or not time t is larger than the footrise time and smaller than the footfall time, namely whether or not the foot 22R (L) is off the ground. If the result is affirmative, control passes to step S16 in which the amount of displacement of the aforesaid coordinate system is calculated in accordance with the time based on the characteristics shown in FIG. 7. At this time, if it is necessary for the robot 1 to turn, for example, this is achieved by turning the movable coordinate system itself. When the result in step S14 is negative, control passes to step S18 in which the movable coordinate system is fixed in real space. Control then passes to step S20 in which the leg trajectory is calculated in the manner illustrated. If step S12 finds that the time t is larger than end, the program is terminated.

The characteristics used as the basis for calculating the amount of displacement of the coordinate system, such as those shown in FIG. 7, can be established in advance or in real time. They can be set using a polynomial or the like, can be made continuous only as regards displacement (amount of movement), can be made continuous also as regards displacement velocity, or, for achieving an even smoother trajectory, can be made continuous also as regards displacement acceleration. An example in which they are established using a finite time settling function generator is described.

Figure 8A:
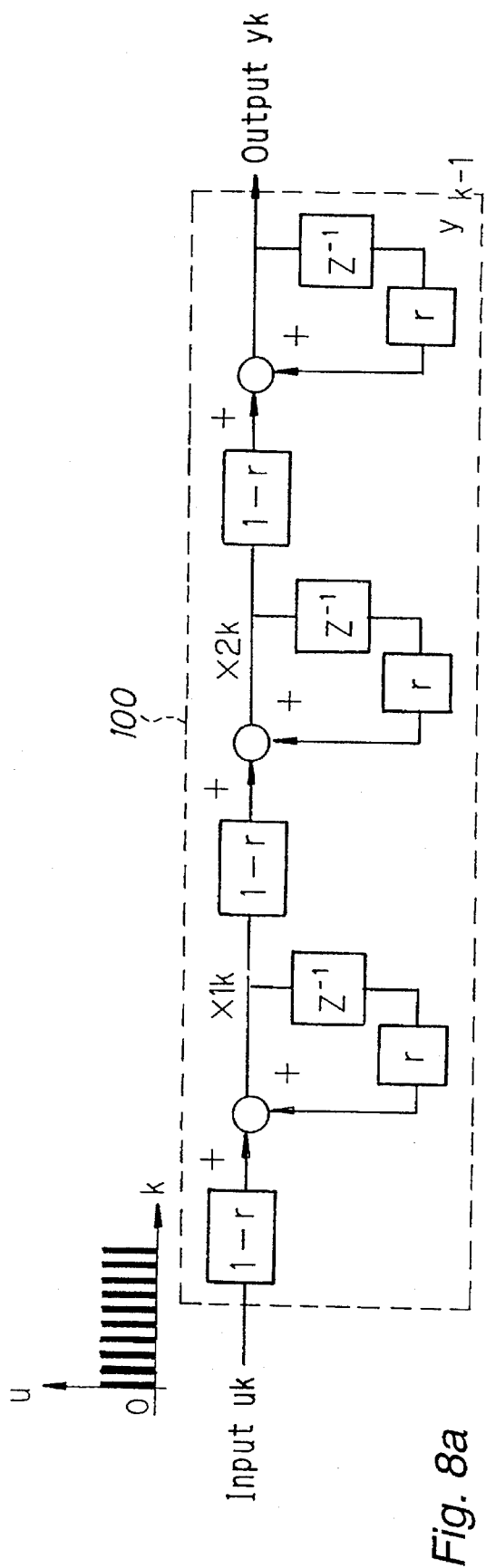
FIG. 8a is a block diagram showing a finite time settling function generator (digital filter) used for determining the displacement amount of the first coordinate system.
Figure 8B:
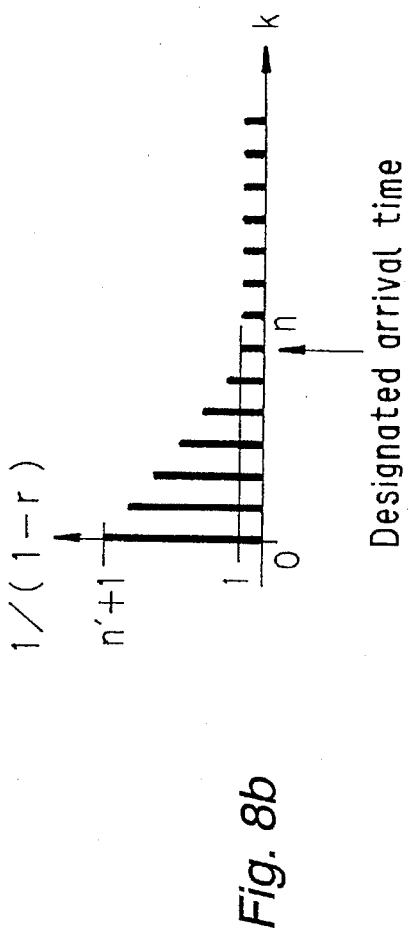

FIG. 8 is an explanatory view of the finite time settling function generator focusing particularly on the input-output characteristics. The function generator is shown as a conventional IIR type digital filter 100. As shown, the filter 100 is applied with an input which immediately changes to the final desired value (of the coordinate system's displacement) at an initial time (the footrise time) t0.

The configuration of FIG. 8 can be expressed as a differential equation as Eq. 1:

$x1k = r * x1k-1 + (1-r) * uk$ $x2k = r * x2k-1 + (1-r) * x1k$ $yk = r * yk + (1-r) * x2k$      Equation 1

(where the pole of the z-plane is designated by r.)

Figure 9:
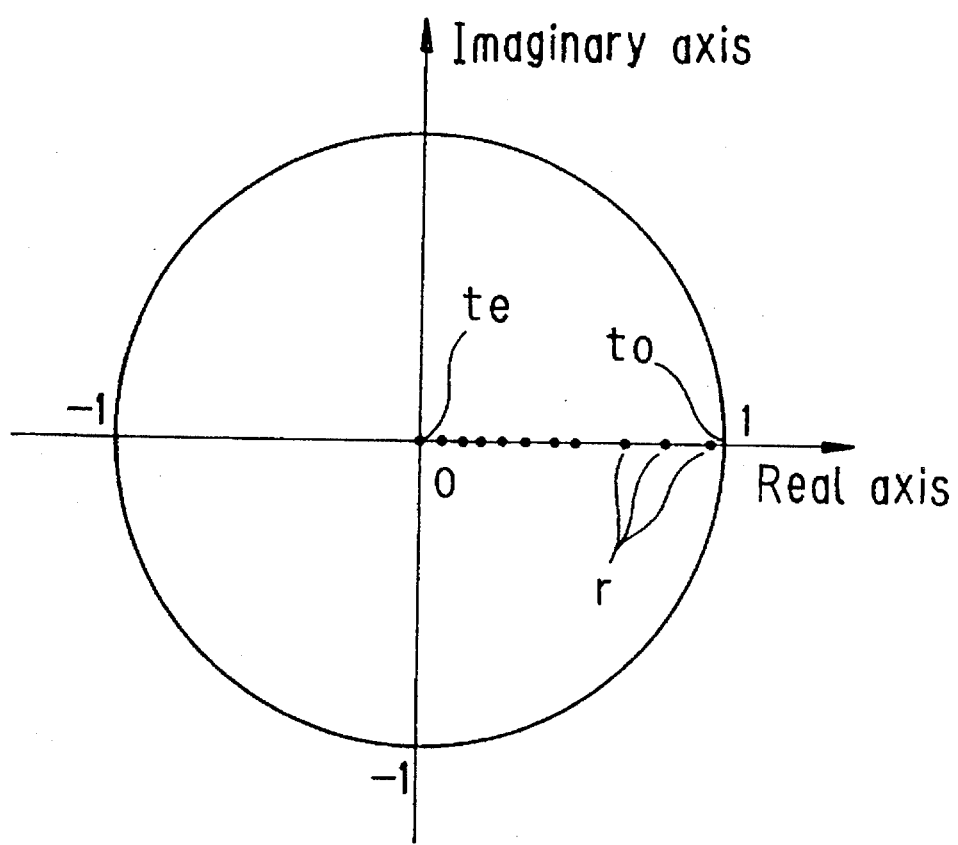
FIG. 9 is a view showing the operation of the function generator of FIG. 8 through its pole location in a z-transformation plane.

Here, the initial value of the pole r is defined as shown in Eq. 2 in such a manner that it is less than 1 and, as shown in FIG. 9, decreases with increasing proximity to a designated arrival time te (the footfall time), so as to disappear at the designated arrival time te.

$$\begin{cases} r = \dfrac{n' - \dfrac{n'}{n} k}{\left(n' - \dfrac{n'}{n} k\right) + 1} & (1 \leq k \leq n) \\ r = 0 & (k > n) \end{cases}$$      Equation 2

The symbol n in Eq. 2 designates the number of steps between the initial time t0 and the designated arrival time te, namely is equal to ((designated arrival time te−initial time t0)/sampling interval). The symbol n' designates a non-negative constant.

Figure 10:
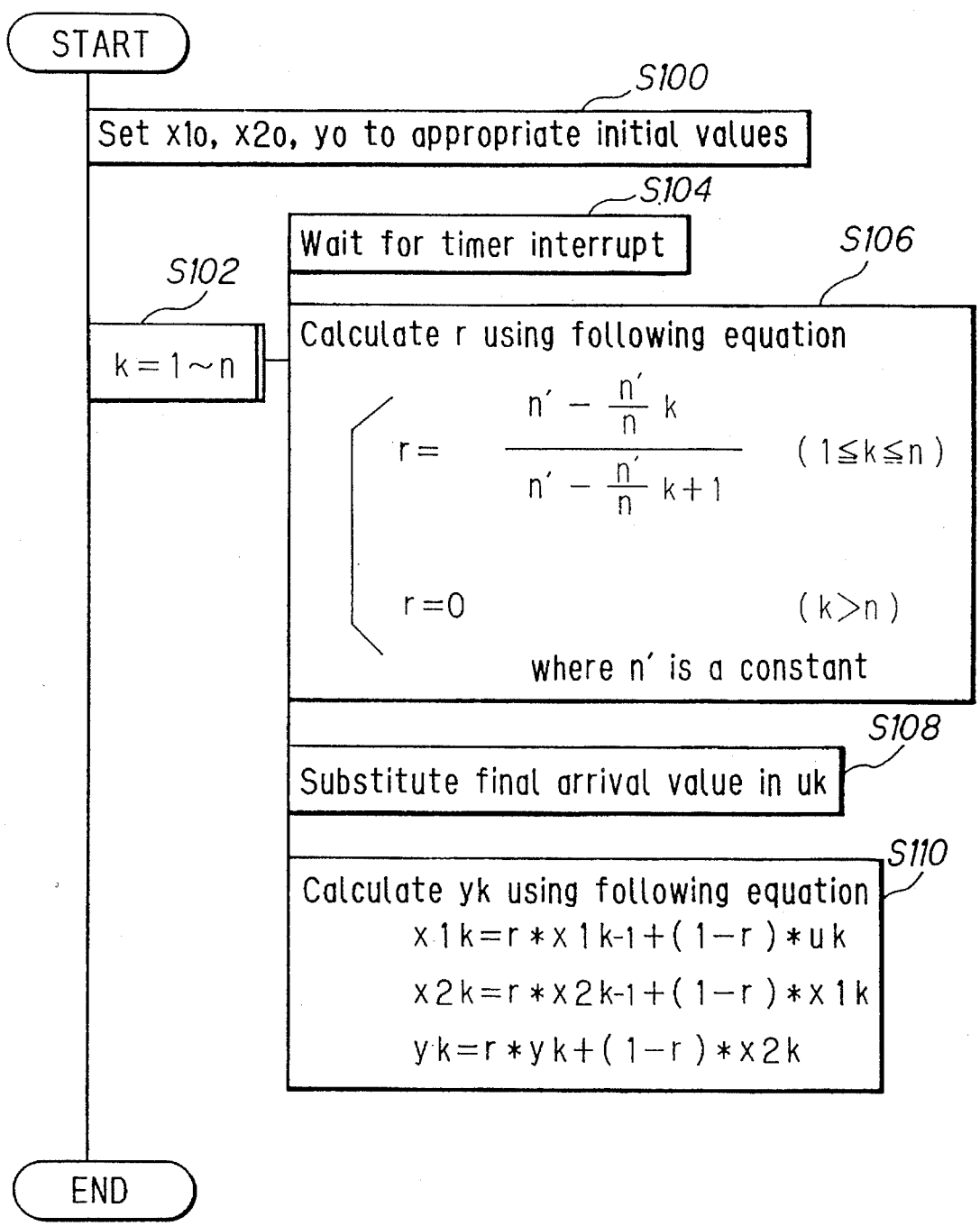
FIG. 10 is a flow chart showing the operation of the function generator for determining the displacement amount of the first coordinate system.
Figure 11:
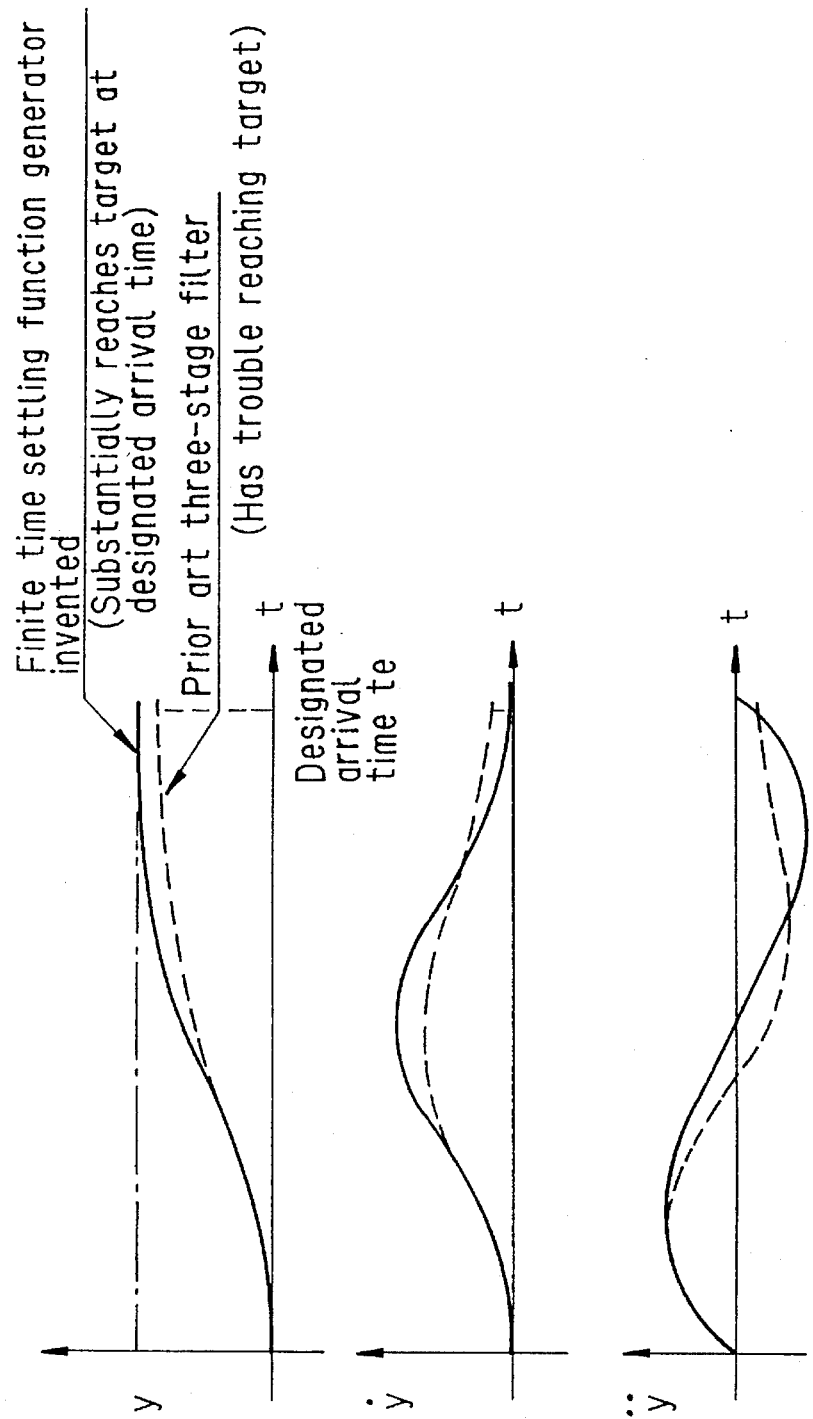
FIGS. 11a, 11b and 11c are waveform charts showing an output of the function generator in analog form for displacement, the first order derivative (velocity), and the second order derivative (acceleration)
Figure 12:
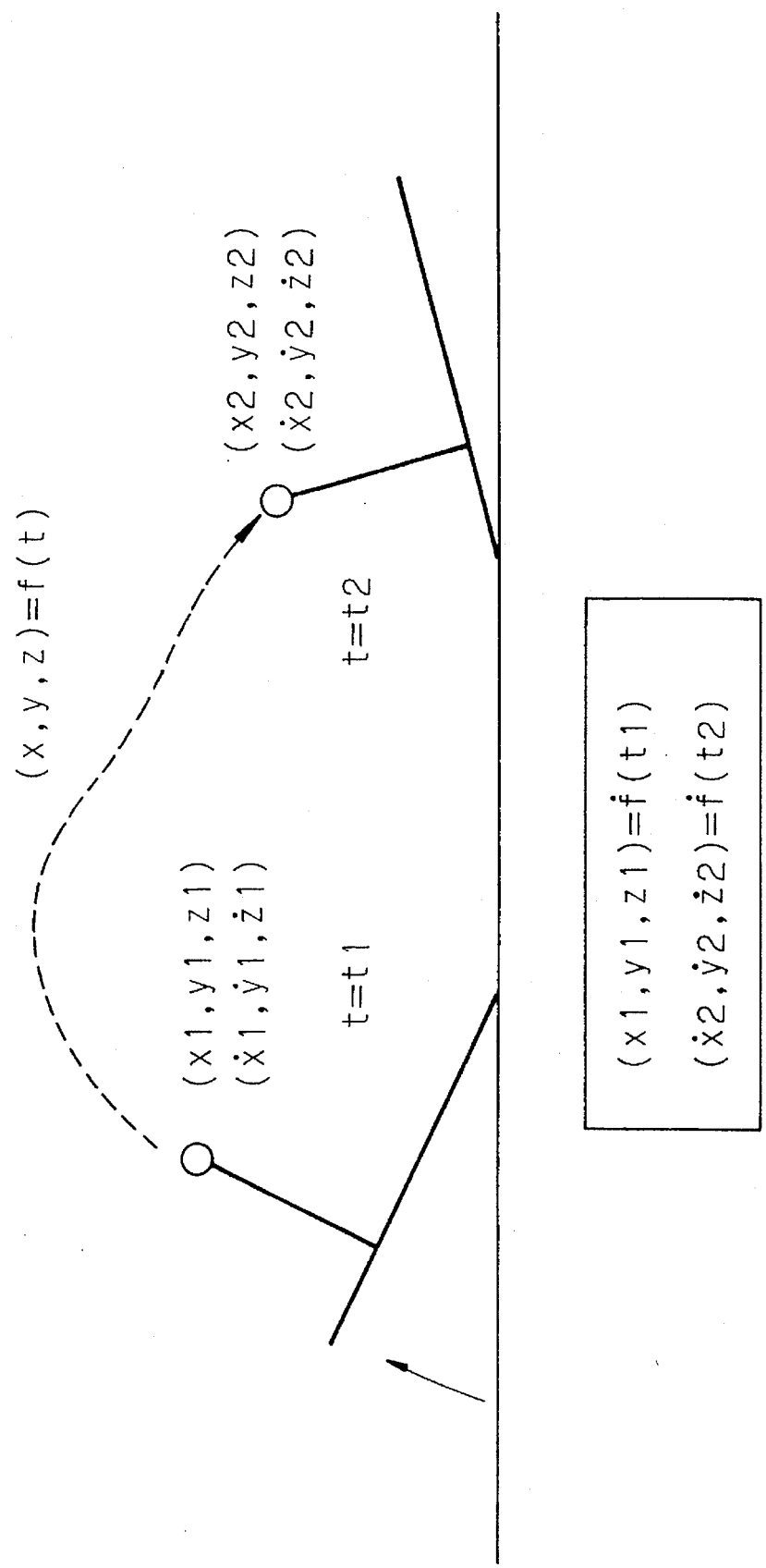
FIG. 12 is a view generally explaining the boundary conditions of a leg (foot) trajectory of a legged mobile robot.

The foregoing will be explained with reference to the PAD diagram of FIG. 10. In step S100 x0 and the like are assigned appropriate initial values. Control then passes to step S102 in which steps S102 to S110 are repeated while increasing k in Eq. 2 from 1 to n in increments of 1. To be specific, control first passes to step S104 in which it waits for a timer interrupt produced once every aforesaid sampling interval. When a timer interrupt occurs, control passes to step S106 in which the value r is obtained from Eq. 2. Control then passes to step S108 in which the aforesaid final desired value is substituted into uk of Eq. 1 and to step S110 in which output yk is calculated using the equations shown. This processing is repeated each time a timer interrupt occurs in step S104. Thus, since the value of pole r is varied from around 1 to 0 so as to gradually decrease the value of 1/(1−r) toward the designated arrival time te, as shown at the bottom of FIG. 8, in other words since the digital filter is modified from one of IIR type at the start to one of FIR type, at the designated arrival time (at nth step) there can be obtained a smooth output that settles with the desired value (the final arrival value). This output is shown in analog form in FIG. 11. As illustrated, such an output as enables the displacement amount settles at the designated arrival time can be obtained at ease. Moreover, such a smooth output as enables even the first order derivative (displacement velocity) and the second order derivative (displacement acceleration) settle to zero at the designated arrival time can be obtained with ease. These advantages cannot be obtained with the ordinary three-stage filter used up to now.

Since a trajectory is generated in the foregoing embodiment by combining a basic trajectory in a given coordinate system and displacing the coordinate system itself, it now possible to generate a smooth, continuous trajectory, for example a leg (foot) trajectory between an arbitrary footrise point and an arbitrary footfall point with an extremely small amount of calculation, irrespective of complex boundary condition and constraint condition restrictions. More specifically, since, as shown in FIGS. 4 and 6, typical trajectories are generated in a given coordinate system as basic trajectories and the coordinate system is displaced as desired when the leg is free and not subject to constraint conditions, only extremely simple constraint conditions are needed. In other words, the boundary conditions can be made simple even in the case where all of the displacement, displacement velocity, displacement acceleration, angle, angular velocity and angular acceleration are to be made continuous. In particular, since all high-order differentials regarding the amount of displacement including turning motion can be made zero, trajectory generation can be easily achieved. In addition, interference with the ground can be avoided simply by adding another displacement amount in the direction concerned. Further, in the foregoing configuration it suffices to calculate the amounts of coordinate system's displacement amount separately for the x, y and z directions and then combine them. The amount of computation can be further reduced. As a result, real time trajectory correction becomes possible at the time the robot encounters an unexpected ground irregularity or inclination. Moreover, trajectories for avoiding obstacles can be calculated more directly. The foregoing also applies in the case where the amount of coordinate's displacement is calculated using a polynomial, and since the amount of polynomial computation can be greatly reduced, real time trajectory correction can be easily achieved.

While the embodiment was explained with reference to straight line walking and turning on level ground, the invention also enables trajectories for various situations including stair climbing and descent with ease.

Although the explanation was made with regard to ankle joint control for determining foot's position and orientation, the invention is not limited to this type of control and can also be applied to a knee joint or a more highly positioned joint.

Although the foregoing explanation was made with respect to application of the invention in a case where the ZMP trajectory and some other walking data are set in advance, this is not limitative and the invention can also be applied in cases where the control values during walking are calculated completely in real time.

Moreover, while the invention was described with reference to a legged mobile robot as an example, the invention can not only be applied to a trajectory generation in other types of mobile robots, but can also be applied to a trajectory generation in various stationary industrial robots. Furthermore, the invention can also be applied to a trajectory generation in movable objects other than robots.

And, while the invention has thus been shown and described with reference to the specific embodiments, it should be noted that it is not limited to the details of the described arrangements, and that changes and modifications may be made without departing from the scope of the appended claims.

What is claimed is:

1. A method for controlling movement of a robot member by generating a trajectory of the member from a point P1 to a point P2 in real space, over a ground comprising:
   (a) establishing a trajectory of the member defining a motion of said member including a constraint condition thereof with respect to the ground in a first coordinate system in a virtual space set in the real space;
   (b) displacing the virtual space including the first coordinate system in the real space including a second coordinate system from the point P1 to the point P2 by translating or rotating the virtual space including the first coordinate system, wherein the virtual space including the first coordinate system is displaced in a period free from the constraint condition; and
   (c) controlling movement of the robot member from P1 to point P2 using the displacement of the virtual space in the real space.

2. A method according to claim 1, wherein the trajectory is established on a virtual plane including the point P1 fixed on the first coordinate system in the virtual space, and the virtual space including the first coordinate system is displaced in the real space including the second coordinate system such that the virtual plane coincides with a plane including the point P2.

3. A method according to claim 1, wherein the virtual space including the first coordinate system is displaced in the real space including the second coordinate system while avoiding an obstacle.

4. A method according to claim 1, wherein the constraint condition includes at least one among a displacement, a displacement velocity, a displacement acceleration, an angle, an angular velocity and an angular acceleration.

5. A method according to claim 1, wherein the trajectory is resolved to that for one among the x, y and z directions defined with respect to the real space including the second coordinate system.

6. A method for generating a trajectory of a member such as a member of a robot and for displacing the member with reference to a fixed surface from a point P1 to a point P2 in real space, comprising:
   (a) establishing a trajectory of the member defining a motion of said member including a constraint condition thereof with respect to the fixed surface in a first coordinate system in a virtual space set in the real space;
   (b) displacing the virtual space including the first coordinate system in the real space including a second coordinate system from the point P1 to the point P2 by translating or rotating the virtual space including the first coordinate system, wherein the displacement of the virtual space including the first coordinate system is determined based on an output of a digital filter by varying a location of a pole of said virtual space in a z transformation plane in such a manner that the pole disappears at a time for the member to arrive on the point p2; and
   (c) displacing the member using displacement of the virtual space.

7. A method for moving a member of a mobile robot on the ground from a point P1 to a point P2 in real space comprising:
   (a) establishing a trajectory of the member defining a motion of the member including a constraint condition relative to the ground in a first coordinate system in a virtual space set in the real space;
   (b) displacing the virtual space including the first coordinate system in the real space including a second coordinate system fixed on the ground from the point P1 towards the point P2, in a period free from the constraint condition;
   (c) fixing the virtual space including the first coordinate system to the real space including the second coordinate system; and
   (d) moving the member based on control information from the displacement of the virtual space.

8. A method according to claim 7, wherein the trajectory is established on a virtual plane including the point P1 in the virtual space, and the virtual space including the first coordinate system is fixed such that the virtual plane coincides with the ground including the point P2.

9. A method according to claim 7, wherein the virtual space including the first coordinate system is displaced in the real space including the second coordinate system by translating or rotating the virtual space including the first coordinate system.

10. A method according to claim 9, wherein the virtual space including the first coordinate system is displaced in the real space including the second coordinate system while avoiding an obstacle.

11. A method according to claim 7, wherein the constraint condition includes at least one among a displacement, a displacement velocity, a displacement acceleration, an angle, an angular velocity and an angular acceleration.

12. A method according to claim 7, wherein the trajectory is resolved to that for one among x, y and z directions defined with respect to the real space including the second coordinate system.

13. A method for generating a trajectory of, and for moving a foot member contacting the ground and connected to the distal end of a leg of a legged mobile robot, comprising:
   (a) establishing a trajectory of the foot member defining a motion of the foot member including a constraint condition relative to the ground in a first coordinate system in a virtual space set in a real space;
   (b) fixing the virtual space including the first coordinate system on the ground until a time when the foot member is to be taken off the ground;

(c) displacing the virtual space including the first coordinate system in the real space including a second coordinate system fixed on the ground, at a period free from the constraint condition;

(d) fixing again the virtual space including the first coordinate system on the ground at a time when the foot member is to be landed on the ground; and (e) controlling movement of the foot member using the displacing and fixing of the virtual space.

14. A method according to claim 13, wherein the trajectory is established on a virtual plane fixed to the virtual space including the first coordinate system, and the virtual space including the first coordinate system is fixed on the ground in the real space such that the virtual plane coincides with the ground.

15. A method according to claim 13, wherein the virtual space including the coordinate system is displaced while avoiding an obstacle.

16. A method according to claim 13, wherein the virtual space including the coordinate system is displaced while decreasing reaction force generated when the foot member lands on the ground.

17. A method according to claim 13, wherein the constrain condition includes at least one among a displacement, a displacement velocity, a displacement acceleration, an angle, an angular velocity and an angular acceleration.

18. A method according to claim 13, wherein the trajectory is resolved to that for one among x, y and z directions defined with respect to the real space including the second coordinate system.

19. A system for generating a trajectory with reference to a fixed plane of a member of a mobile robot to be displaced from a point P1 to a point P2, comprising:

first processing and memory means for establishing a trajectory of the member defining a motion of said member including a constraint condition thereof with respect to the fixed plane, in a first coordinate system in a virtual space set in real space;

second processing means for displacing the virtual space including the first coordinate system in the real space including a second coordinate system, at a period free from the constraint condition;

third means for combining the trajectory in the first coordinate system and the displacement of the first coordinate system in the virtual space to generate a trajectory of the member from the point P1 to the point P2; and an actuator linked to said member of the robot and controlled by the third means for moving said member from point P1 to point P2.

20. A system according to claim 19, wherein said first means establishes the trajectory on a virtual plane fixed to the first coordinate system in the virtual space, and said second means displaces the virtual space including the first coordinate system in the real space including a second coordinate system until the virtual plane coincides with a plane including the point P2.

21. A system according to claim 19, wherein said second means displaces the virtual space including the first coordinate system while avoiding an obstacle.

22. A system according to claim 19, wherein said first means establishes the trajectory to that for one among x, y and z directions defined with respect to the real space including the second coordinate system.

23. A method for generating a trajectory of a member such as a member of a robot to be displaced from a point P1 to a point P2 in real space, comprising:

(a) establishing a trajectory of the member defining a motion of said member including a constraint condition thereof in a first coordinate system; and (b) displacing the first coordinate system in a second coordinate system from the point P1 to the point P2 by translating or rotating the first coordinate system, in a period free from the constraint condition.

24. A method for generating a trajectory of a member of a mobile robot to be displaced on the ground from a point P1 to a point P2 in real space comprising:

(a) establishing a trajectory of the member defining a motion of said member including a constraint condition thereof in a first coordinate system;

(b) displacing the first coordinate system in a second coordinate system fixed on the ground from the point P1 towards the point P2, in a period free from the constraint condition; and (c) fixing the first coordinate system to the second coordinate system.

25. A method for generating a trajectory of a foot member contacting the ground and connected to the distal end of a leg of a legged mobile robot, comprising:

(a) establishing a trajectory of the foot member defining a motion of said member including a constraint condition thereof in a first coordinate system;

(b) fixing the first coordinate system on the ground until a time the foot member is to be taken off the ground;

(c) displacing the first coordinate system in a second coordinate system fixed on the ground in a period free from the constraint condition; and (d) fixing again the first coordinate system on the ground at a time when the foot member is to be landed on the ground.

26. A system for generating a trajectory of a member of a mobile robot to be displaced from a point P1 to a point P2, comprising:

first means for establishing a trajectory of the member defining a motion of said member including a constraint condition thereof in a first coordinate system in;

second means for displacing the first coordinate system in a second coordinate system in a period free from the constraint condition; and third means for combining the trajectory in the first coordinate system and the displacement of the first coordinate system to generate a trajectory of the member from the point P1 to the point P2.

27. A method for generating a trajectory of a member such as a member of a robot to be displaced from a point P1 to a point P2 in real space, comprising:

(a) establishing a trajectory of the member defining a motion of said member including a constraint condition thereof in a first coordinate system; and (b) displacing the first coordinate system in a second coordinate system from the point P1 to the point P2 by translating or rotating the first coordinate system, based on an output of a digital filter by varying the location of its pole in a z transformation plane in such a manner that the pole disappears at a time for the member to arrive on the point P2.

* * * * *